Oct. 23, 1945. J. W. MYERS 2,387,460
ELECTRICAL COOKING APPARATUS
Filed Feb. 24, 1941 3 Sheets-Sheet 2
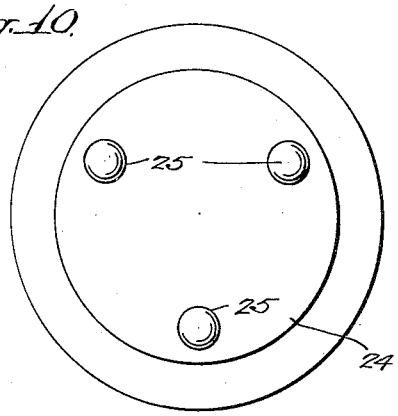
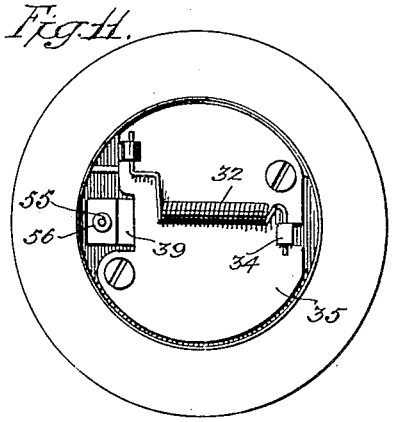
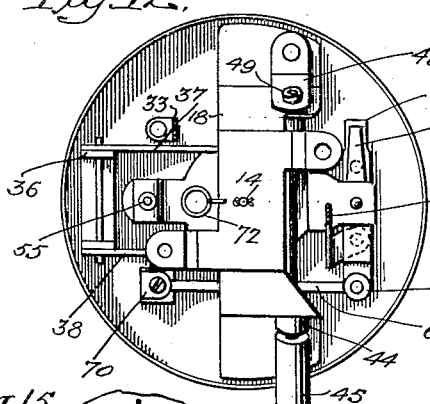
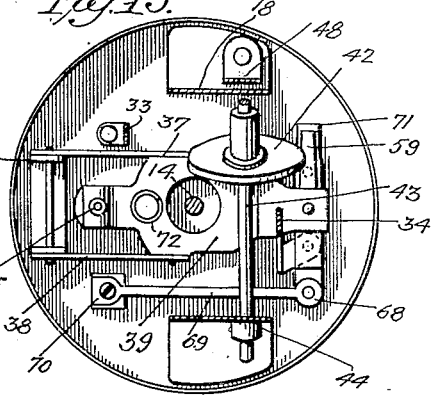
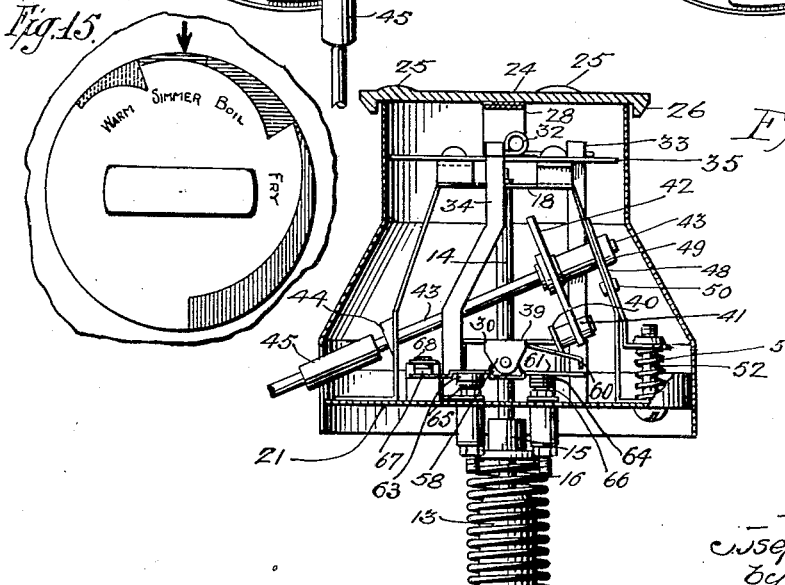
Inventor
Joseph W. Myers
by his Attorneys
Howson & Howson

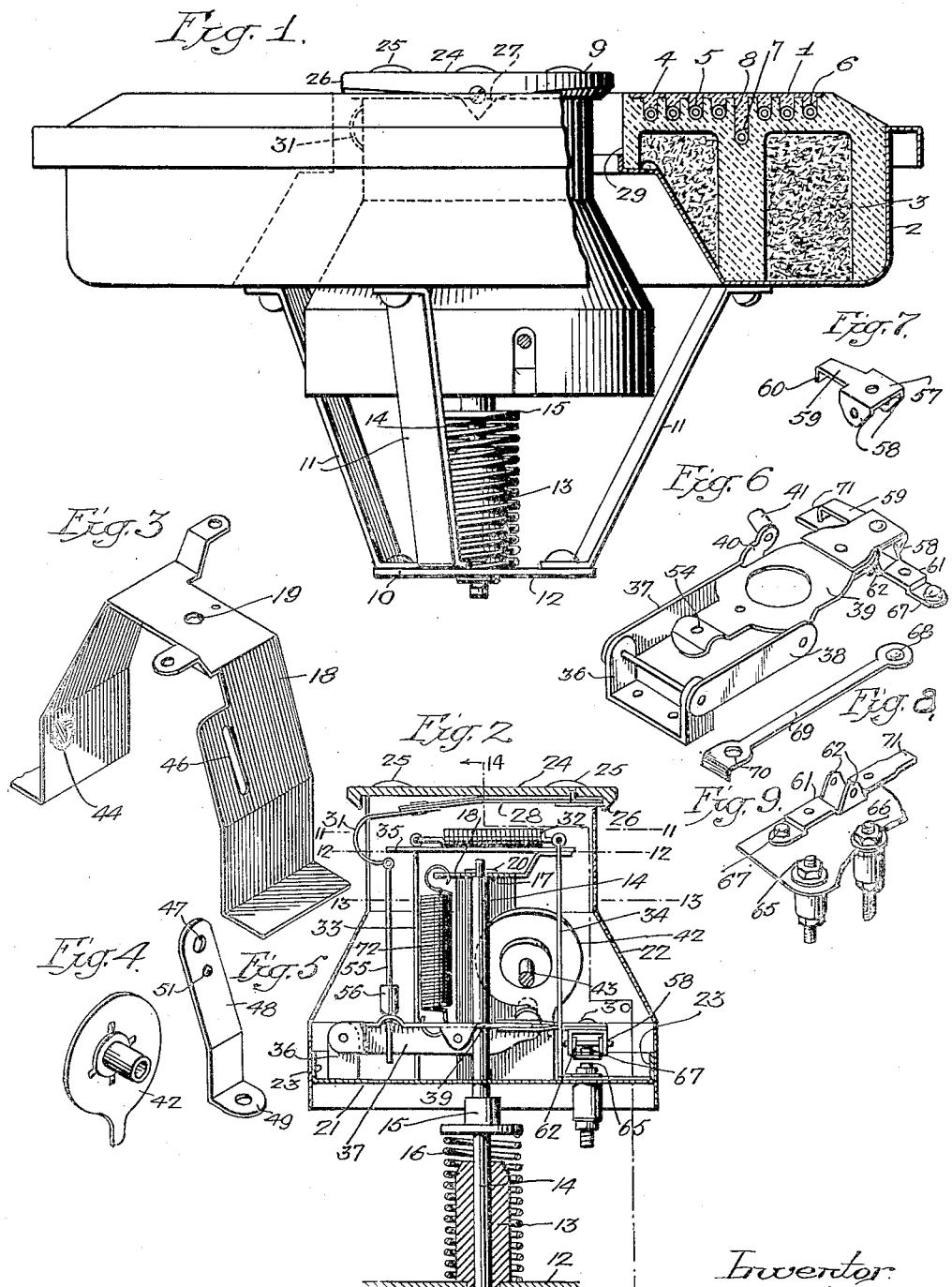

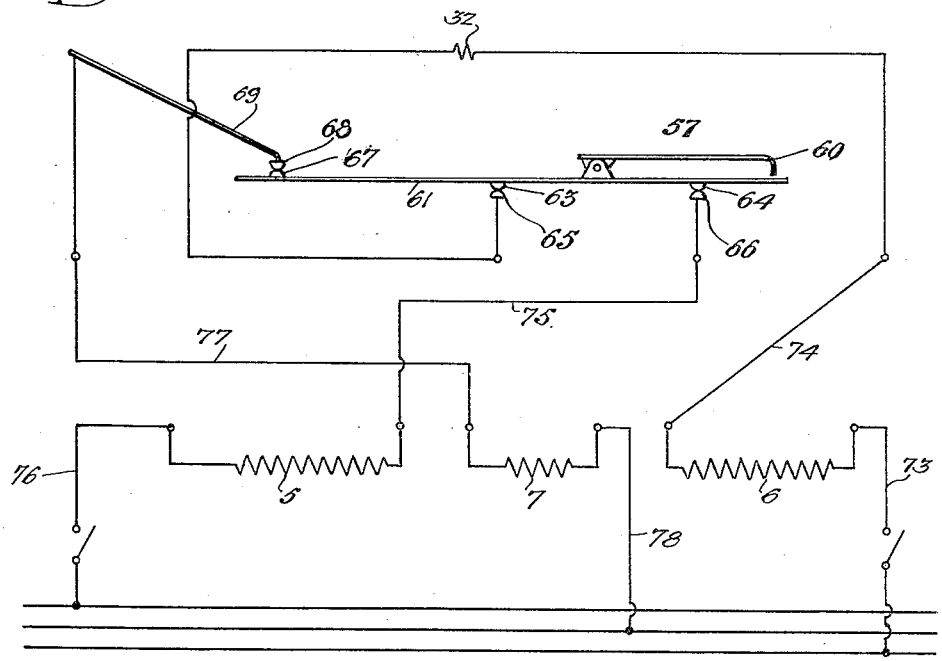
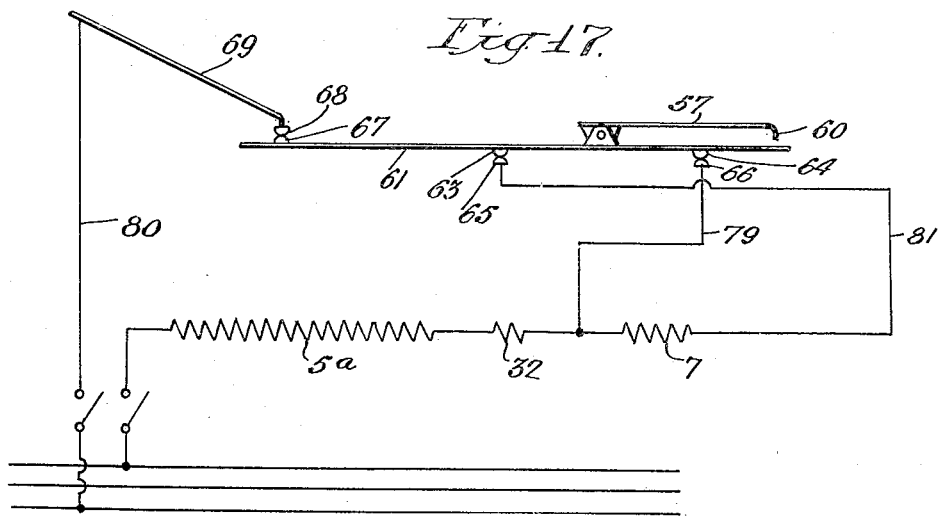

Patented Oct. 23, 1945

2,387,460

UNITED STATES PATENT OFFICE 2,387,460

ELECTRICAL COOKING APPARATUS

Joseph W. Myers, Philadelphia, Pa., assignor to Proctor & Schwartz, Inc., Philadelphia, Pa., a corporation of Pennsylvania Application February 24, 1941, Serial No. 380,341

11 Claims. (Cl. 219—37)

This invention relates to electrical cooking apparatus, and more particularly to a novel control apparatus for an electric surface-type cooking unit for electric ranges and the like.

The present invention is directed generally to the type of control apparatus disclosed and claimed in the Myers and Roesch Patent No. 2,140,479, granted December 13, 1938. In the said patent, there is disclosed a control device comprising an adjustable thermostatic switch which is controlled by the temperature of a cooking vessel placed on the cooking unit with which the said device is associated; and in order to permit different degrees of ebullition or boiling, the thermostatic device is subjected to heat from a heated part of the apparatus, as well as the temperature of the cooking vessel. Experience has shown, however, that where the secondary heat (i. e., the heat from a heated part of the apparatus) is derived from the heating unit, as disclosed in the said patent, such heat is variable, depending on how long the heating unit has been operating and the rate of heat generation of the unit. Consequently, under certain conditions, as mentioned hereinafter, the degree of ebullition is adversely affected.

According to the present invention, means are provided to compensate for or nullify the effects of heat from the heating unit when a cooking vessel is placed thereon, and other means are employed in combination with such compensating means to obtain highly accurate control and smooth operation for different degrees of boiling and other cooking operations, and to insure rapid closing or opening of the heating circuit in response to the placement of a vessel on, or removal of the vessel from, the heating unit.

One object of the invention, therefore, is to provide a novel compensating means in a control device of this character, in combination with other features which make for accurate control and smooth operation.

Another object of the invention is to provide novel means for assuring uniform affectation of the cooking vessel upon the thermostatic control device.

A further object of the invention is to provide for different wattage levels of the cooking unit which are controlled in a manner to give efficient and smooth operation for different degrees of boiling and other cooking operations.

Another object of the invention is to provide novel means for obtaining a wide range of boiling and simmering operations, with a broad and certain zone of predetermined simmering wattage.

A further object of the invention is to provide a novel construction wherein provision is made for preventing grease or other substances from creeping into the thermostatic control mechanism.

Other objects and features of the invention will appear hereinafter.

In the accompanying drawings,

Fig. 1 is an elevational view of a surface-type cooking unit and an associated control device constructed according to the invention, a portion of the cooking unit being shown in section to illustrate the construction thereof;

Fig. 2 is a sectional view of the control device alone;

Figs. 3 to 9 are perspective views illustrating various parts of the control device;

Fig. 10 is a plan view of the control device, illustrating a certain feature thereof;

Fig. 11 is a sectional view taken along line 11—11 of Fig. 2;

Fig. 12 is a sectional view taken along line 12—12 of Fig. 2;

Fig. 13 is a sectional view taken along line 13—13 of Fig. 2;

Fig. 14 is a vertical sectional view of the control device taken along line 14—14 of Fig. 2;

Fig. 15 is a face view of the manual control for the device;

Fig. 16 is a diagrammatic illustration of the electrical circuits and switching arrangement of the control device and associated cooking unit; and Fig. 17 is a diagrammatic illustration of an alternative embodiment.

Referring first to Fig. 1, there is shown an annular surface-type cooking unit 1 which comprises a metal receptacle or container 2, an annular refractory body 3 having a spiral surface groove therein to accommodate the heating element or elements, and one or more heating elements disposed in the said grooves and covered by means of refractory cement 4. The heating element preferably comprises two main sections 5 and 6 and an auxiliary low wattage section 7. As illustrated, one of the main sections of the heating unit, i. e. the section 5, may be disposed in the inner part of the spiral surface groove of the supporting body 3, while the other main section 6 may be disposed in the outer part of the spiral surface groove. Preferably, the auxiliary low wattage section 7 is disposed in a deep groove 8 in an intermediate position. This auxiliary section functions cooperatively with the main heating unit sections and the switching arrangement described hereinafter to give highly efficient and smooth operation for different degrees of boiling and other cooking operations, as will be described in detail later. The cooking unit per se, as disclosed in Fig. 1, forms the subject of a copending Myers and Roesch application, Serial No. 425,330, filed January 1, 1942.

The control device designated generally by reference character 9 is supported by means of a bracket 10 having legs 11 secured to the underside of the cooking unit. As shown in Fig. 2, the base plate 12 which forms an integral part of bracket 10 carries a stationary sleeve 13 through which a rod 14 extends. The rod 14 has mounted thereon a flange collar 15. A helical spring 16 surrounds sleeve 13 and rod 14 and is disposed between the plate 12 and the flanged collar 15. The control device is supported as a unit by means of this resilient mounting.

The upper end of rod 14 is diminished in diameter and is provided with a shoulder 17 upon which a yoke 18 (see Fig. 3) is freely suspended. To this end, the yoke 18 has an aperture 19 of larger diameter than the upper end of rod 14, so that the yoke seats loosely on shoulder 17 and may adjust itself laterally in any direction for a purpose to be described presently. A cotter key 20 may be employed to prevent the yoke from becoming detached from the rod 14.

The lower outwardly turned ends of yoke 18 are secured to a plate 21 (see Figs. 2 and 14) which constitutes a supporting base for certain elements of the device. A casing or housing 22 is removably secured to the upturned outer edge 23 of plate 21. A relatively thick metallic plate or disc 24 closes the top of the housing and is permanently secured thereto. The plate 24 serves as the medium through which heat is derived from the bottom of a cooking vessel placed on the cooking unit 1 and is preferably formed of aluminum because of its high thermal conductivity. In the absence of a cooking vessel, the spring 16 urges the unitary control device upward so that the plate 24 is disposed slightly above the surface of cooking unit 1, as shown in Fig. 1. When a cooking vessel is placed on the cooking unit, the weight of the vessel depresses the unitary device against the action of spring 16. In this way, it is assured that the plate 24 shall always engage a cooking vessel placed on the cooking unit.

As previously mentioned, an important feature of the invention is the provision of means for assuring a uniform affectation of any cooking vessel upon the control device. It is well known that the bottoms of cooking vessels are apt to vary one from another. For example, the bottom of one vessel may be concave or it may be convex or it may be deformed by rough usage. To compensate for these and other variations in contour of cooking vessel bottoms, the control device is made self-adjusting on the supporting rod 14 by means of the loose mounting of yoke 18 above described, and there are provided on the upper surface of plate 24 a plurality of protuberances 25 as shown in Fig. 10. Preferably, there are three button-like protuberances so that the control device contacts the bottom of the cooking vessel in three places only. By virtue of the self-adjusting feature and the three-point contact arrangement, it is assured that the control device shall always engage the bottom of a cooking vessel in the same way, and, therefore, the influence of the temperature of the cooking vessel upon the control device is always uniform.

As shown in Figs. 1 and 2, the circumferential portion of plate 24 has a downwardly extending flange 26, which is formed so as to provide a plurality of spaced pointed projections 27, and the portions of the flange between these projections are beveled and inclined downwardly toward the projections 27 to provide runways along which any liquid substance may run toward the projections. As will be well understood, such construction will promote the formation of drops, that is it will cause a liquid substance to concentrate and run to the pointed ends of projections 27 and drip from the projections in the form of drops. Thus the specially constructed flange 26 acts as a grease remover and prevents grease from diffusing over the inside surface of plate 24 and getting onto the operating parts of the thermostatic control device.

The operation of the control device in accordance with the temperature of the bottom of a cooking vessel placed on the cooking unit, is effected by means of a thermostatic element 28 (see Fig. 2) in the form of a bi-metallic strip secured to the under side of plate 24. This thermostatic element is directly affected by the heat conducted from the cooking vessel bottom through the heat-conductive plate 24, and it is also affected by heat from the heating unit, particularly the inner surface 29 thereof (see Fig. 1). This secondary heat is transferred from adjacent parts of the heating unit by radiation and convection. In the control device disclosed in the above-mentioned patent, this secondary heat is utilized to effect different degrees of ebullition or boiling over a wide range, as fully described on page 3 of the said patent, beginning at line 69, column 1 of the said page.

As previously mentioned, however, the heat derived from the heating unit varies with time and rate of operation, and in some instances such variation tends adversely to affect the control for different degrees of ebullition. For example, if the device is set for rapid boiling, and if such boiling were continued for a long period of time, the surface 29 and the back structure of the heating unit would rise in temperature compared to the temperature of the upper surface contacting the cooking vessel, and the increased heat transferred to the control device tends to cause the rapid boiling to degenerate into a simmering operation. In accordance with the present invention, there is provided a means for nullifying the effect of heat transferred from the heating unit by radiation and convection, and other means are provided in combination with said compensating means to give highly efficient control and smooth operation.

The thermostatic switch, designated generally by reference character 30, is operated by the thermostatic element 28, but instead of the switch being operated directly by the thermostatic element, it is operated indirectly through a compensating thermostatic element 31. This latter element comprises a thinner strip of bimetal than the element 28, and it is attached to the free end of element 28 and projects in a semi-circle through an opening in the side wall of the casing 22 into the annular space between the heating unit and the thermostatic control device, as shown in Fig. 2. By virtue of this arrangement, the element 31 is sensitive to the air surrounding the device, thus responding quickly to heat transferred from the heating unit by radiation and convection and to rising cooling air currents flowing upward through said annular space upon removal of the cooking vessel while the device is in a heated condition, and the said element operates in a direction opposite to that of the main thermostatic element 28. The effect of element 31 is to nullify the effect of the heating unit on the main thermostatic element within the casing 22 as long as the cooking vessel is on the heating unit but to tend to open the switch through its cooling on removal of the vessel, and to close the switch due to its heating upon placement of the vessel on the already heated unit. Thus the device is substantially compensated with a cooking vessel on the unit, but acts as though undercompensated upon removal of the vessel; and because of this undercompensation, it is possible for the switch to be opened due to the direct action of the heating unit alone in the absence of the vessel. Preferably, though not necessarily, provision is made for a wide range of boiling operations in accordance with the teachings of the above-mentioned patent. To this end, there is provided an auxiliary heating element 32 disposed adjacent to the main thermostatic element 28. As illustrated in Fig. 2, the heating element 32 may be supported by means of current conductive supporting strips 33 and 34, and an insulating sheet 35 may be mounted on the supports below the heating element. The heating element 32 is connected in circuit with the cooking unit.

The particular switch structure employed comprises a supporting bracket 36 mounted on plate 21, a pair of arms 37 and 38 (see Fig. 6) pivotally attached to the bracket 36, and a lever 39 pivotally carried at the ends of the said arms. The arm 37 has an extension 40 upon which a roller 41 is mounted. This roller is engaged by a cam 42 (see Fig. 14) which is carried by an inclined rotatable shaft 43 supported by the opposing legs of yoke 18. The lower portion of shaft 43 extends through a bearing aperture 44 in one leg of the yoke, while the upper portion of the shaft extends through a slot 46 (see Fig. 3) in the other leg of yoke 18 and through an aperture 47 (see Fig. 5) in a bracket 48 slidably carried by said other leg. A collar 49 keyed to the end of the shaft prevents axial movement thereof. A rivet 50 passing through an aperture 51 in bracket 48 and through slot 46, serves to slidably mount the bracket 48 on yoke 18. The lower foot portion of bracket 48 threadedly engages an adjustment screw 52 which extends upward through an opening in base plate 21. A spring 53 maintains the screw in position. By turning the screw 52, the bracket 48 is caused to move up or down to adjust the position of cam 42 and thereby vary its effect upon the switch.

The shaft 43 may be manually operated in any suitable manner to adjust the setting of cam 42 and thereby vary the setting of the switch. For example, a flexible shaft and control knob (see Fig. 15) may be connected to the shaft 43 by means of coupling 45 and may be operated from any suitable position at which there may be a control panel.

At one end of lever 39 (see Fig. 6) there is an aperture 54 through which a pin 55 extends, as shown in Fig. 2. A sleeve or collar 56 fixed to pin 55 bears on the said end of lever 39. The upper end of pin 55 is connected to the compensating thermostatic element 31. At the other end of lever 39 there is mounted a bracket 57 (see Fig. 7) which has downwardly turned ears 58 and an extension 59 whose end is turned downwardly at 60. A contact bridge 61 (see Figs. 6, 9 and 14) has upwardly turned ears 62 which are pivotally connected to the ears 58 on bracket 57. A pair of spaced contact elements 63 and 64 are carried by the bridge 61 and are adapted to engage stationary contacts 65 and 66 mounted on plate 21 and insulated therefrom. At one end of the bridge 61 there is a contact 67 which is constantly engaged by a contact 68 on the end of a resilient arm 69, the opposite end of which is secured to plate 21 at 70 and insulated therefrom (see Fig. 13). At the other end of bridge 61 there is an extension 71 which is disposed below the downwardly turned end 60 of bracket 57. A spring 72 (see Fig. 2) has its upper end secured to yoke 18 and its lower end secured to lever 39. This spring urges the lever 39 clockwise, as viewed in Fig. 2, and tends to maintain the contacts in engagement.

Considering the operation of the switch structure as a whole, it will be seen that arms 37 and 38 which carry roller 41 are urged upwardly by spring 72 which also urges the switch contacts into engagement. Adjustment of the cam 42 from the low portion thereof to the high portion will lower the fulcrum point of lever 39; and since the switch contacts at one end of the lever are in engagement, the effect of the cam adjustment will be to lower the actuating end of lever 39 relative to the collar 56 on pin 55. Thus, the cam varies the position of the actuating end of lever 39 with respect to collar 56, thereby varying the amount of movement of pin 55 by the thermostatic element 28 necessary to rotate lever 39 about its fulcrum and thus open the switch contacts. By proper design, the different settings of cam 42 may be made to correspond to different temperatures at which the switch will operate, thereby to control the operating temperature level of the cooking unit.

In operation of the switch, the effective downward movement of thermostatic element 28, caused by the temperature of the cooking vessel and the heat derived from the heating element 32, effects downward movement of the pin 55 to eventually rotate lever 39 as above mentioned. The rocking of lever 39 about its fulcrum tends to raise the contact bridge 61, but since the resilient arm 69 presses downward upon one end of the bridge, as shown in Fig. 14, the bridge rotates about its pivot, causing contact 64 to rise, while contact 63 remains in engagement with its associated contact 65. If the lever 39 is rotated still further about its fulcrum, the extension 71 on contact bridge 61 will come into engagement with the stop 60, thus preventing further pivotal movement of the bridge and causing contact 63 to rise against the action of arm 69. Thus, the two sets of contacts operate at different temperature levels, the contacts 64 and 66 being opened first at one temperature level, and the contacts 63 and 65 being opened later at a higher temperature level. The purpose of this operation will be clearly understood from the subsequent description.

Referring now to Fig. 16, the multi-section heating unit and the electrical elements of the control device are shown connected to a conventional three-conductor supply line. As will be seen later, the low wattage section 7 of the heating unit is arranged for serial connection with one of the main heating unit sections between low voltage conductors of the supply line. The voltage across the two outer supply conductors may be assumed to be 230 volts, while the voltage between one of the outer conductors and the center or neutral conductor may be 115 volts. The main heating unit sections may each be a 700 watt section, and the low wattage section 7 may be designed to develop about 250 watts when connected in series with one of the main sections across 115 volts.

Assuming that cam 42 has been manually adjusted, as above described, to effect operation of the heating unit at a desired temperature level, the switch contacts will be closed, as illustrated in Fig. 16, and the main heating unit sections 5 and 6 will be connected in series across the outer supply conductors through a circuit which may be traced as follows: from the lowermost supply conductor through connection 73, section 6, connection 74, heating element 32, contact bridge 61, connection 75, heating unit section 5, and connection 76 to the uppermost supply conductor. It will be apparent that no current will flow at this time through the low wattage section 7 since the contact bridge 61 is closed and there is no voltage at the bridge and no current flowing to the neutral line. When the temperature level is reached at which the contacts 64 and 66 open, the low wattage heating unit 7 is placed in series with the main section 6 and current flows from the lowermost supply conductor through these serial sections to the neutral line through a circuit which may be traced as follows: from the lowermost supply line, through connection 73, heating unit section 6, connection 74, heating element 32, the closed contacts 63 and 65, closed contacts 67 and 68, resilient arm 69, connection 77, low wattage section 7, and connection 78 to the neutral line.

If the cam 42 is set for low boiling or simmering operation, the bridge contacts 64 and 66 will open when the contents of the cooking vessel reach the boiling point and the low wattage unit 7 will be rendered effective as above described. The low wattage level which then constantly obtains will be sufficient to maintain the attained temperature of the vessel contents and to continue the cooking operation as a low boiling operation without further operation of sections 5 and 6.

In the case of high boiling, or other operations such as frying, requiring higher temperatures, the cam 42 will be adjusted to a higher point and the contacts 64 and 66 will open at the temperature corresponding to the adjustment. However, the low wattage level will be insufficient to maintain the higher temperature of bi-metal 28 and higher rate of boiling and, therefore, the contacts 64 and 66 will intermittently close and open to supply the necessary heat by raising the wattage level whenever required. In cases where the heater 32 is omitted, one obtains two degrees of boiling; a hard boil when contact points 64 and 66 are closed, and a low boil or simmer when these points are made to separate just prior to the boiling point, and the low wattage unit 7 then becomes energised by said separation. The rocking permitted to bar 61 by the space between its ends and stop 60, produces the broad, low wattage simmer zone referred to previously.

For operation requiring very low temperature, for example when it is merely desired to keep the contents of the cooking vessel warm, the cam 42 will be set at a very low point and, consequently, the actuating end of lever 39 will be very close to collar 56 on pin 55. As a result, the contacts 64 and 66 will open at a low temperature corresponding to the adjustment of the cam 42. This will reduce the wattage of the heating unit but the low wattage will supply more than enough heat to maintain the low temperature. Consequently the contacts 63 and 65 will open and close intermittently so that the heating unit will be operated intermittently at its low wattage level. Of course, if the temperature of the cooking vessel should drop below the selected low temperature, the contacts 64 and 66 will close to raise the wattage to the high level.

From the foregoing description it will be seen that the present invention provides a novel apparatus in which the effect of the cooking unit on the control device is nullified by the compensating thermostat 31 and provision is made for operating the cooking unit at different wattage levels under control of the thermostatic device according to the setting of said device. Moreover the affectation of the cooking vessel on the control device is made uniform regardless of the contour of the vessel bottom. By means of such apparatus it is possible to obtain accurate control and smooth operation for low and high boiling and similar operations. At low boiling and low temperature settings particularly the operation is smooth and, furthermore, the operation of the switch contacts is reduced to minimum thereby minimizing any deleterious effect of such operation, such as interference with radio receivers.

In addition, the utilization of the auxiliary heater 32 enables a wide range of boiling operation even though the bottom of the cooking vessel is at a temperature of 212° so long as there is any water in the vessel. This action is fully explained in the aforementioned patent. Moreover, since the effect of heater 32 is constant and predictable, the selected degree of ebullition is maintained constant over an indefinitely long period of time.

In Fig. 17, there is illustrated an alternative embodiment wherein the main heating unit 5a comprises a single section and the connections are such that the control switch functions to insert the low wattage element 7 in series with the main heating unit across the high voltage conductors of the three-conductor supply line. In this device, the main heating element 5a may comprise the elements 5 and 6 of the previously described embodiment arranged as illustrated in Fig. 1, the only difference being in the electrical connections. The heating elements 5a and 7 may be designed to develop about 250 watts when connected serially across the high voltage conductors.

In operation, the low wattage element 7 is initially short-circuited by conductor 79 and closed contacts 64 and 66, and the main heating element 5a is connected across the outer supply conductors through a circuit including conductor 79, contacts 64—66, bridge 61, contacts 67—68, resilient arm 69, and conductor 80. When contacts 64—66 open, the short circuit is removed from element 7 and the latter is connected in series with the main heating element 5a through a circuit including conductor 81 and closed contacts 63—65.

Aside from the different electrical arrangement, this device is similar to the one previously described and operates in the same manner. It is deemed unnecessary, therefore, to repeat the description of the specific operation of the device.

From the foregoing description, it will be seen that the present invention provides an improved device having the several desirable characteristics and features above pointed out. It will be understood, of course, that the invention is not limited to the specific forms of the device illustrated but

I claim:

1. In an electrically operated cooking apparatus, a multi-section electrical heating unit adapted to operate at different wattage levels, an electrical circuit for energizing said unit, an adjustable thermostatic control device constructed and arranged to receive primary heat by thermal conduction from a cooking vessel placed on said heating unit but also receiving secondary heat from a part of the apparatus whose temperature is subject to undesirable variations, a thermostatic element on said device, means for substantially nullifying the effect of said secondary heat upon said thermostatic element, a switch operable by said thermostatic element and included in circuit with said heating unit to control the same, said switch being adapted in one position to operate said heating unit at one wattage level and upon movement to another position to operate said unit at a relatively low wattage and upon further movement in the same direction to deenergize said unit, and manually operable means for adjusting said switch for warming, simmering and boiling operations, the operation of the heating unit by said switch for the different adjustments being as follows: intermittent on-off operation of the unit at its low wattage level for warming of the vessel contents after the selected temperature has been attained, continuous operation of the unit at its low wattage level during simmering and slow boiling of the vessel contents, and operation of the unit at its high wattage level during rapid boiling of the vessel contents.

2. In an electrically operated cooking apparatus, a multi-section electrical heating unit adapted to operate at different wattage levels, an electrical circuit for energizing said unit, an adjustable thermostatic control device constructed and arranged to receive primary heat by thermal conduction from a cooking vessel placed on said heating unit but also receiving secondary heat from a part of the apparatus whose temperature is subject to undesirable variations, a thermostatic element on said device, means for substantially nullifying the effect of said secondary heat upon said thermostatic element, a switch operable by said thermostatic element and included in circuit with said heating unit to control the same, said switch including plural sets of contacts and being adapted when actuated in one direction to operate one set of contacts and upon further predetermined movement to operate a second set of contacts, electrical connections controlled by said switch so as to operate said heating unit at one wattage level prior to operation of said first set of contacts, and to operate said heating unit at a lower wattage level when said first contacts are operated, and to deenergize said heating unit when said second contacts are operated, and manually operable means for adjusting said switch for warming, simmering and boiling operations, the operation of the heating unit by said switch for the different adjustments being as follows: intermittent on-off operation of the unit at its low wattage level for warming of the vessel contents after the selected temperature has been attained, continuous operation of the unit at its low wattage level during simmering and slow boiling of the vessel contents, and operation of the unit at its high wattage level during rapid boiling of the vessel contents.

3. In an electrically operated cooking apparatus, a multi-section electrical heating unit adapted to operate at different wattage levels, an electrical circuit for energizing said unit, an adjustable thermostatic control device constructed and arranged to receive primary heat by thermal conduction from a cooking vessel placed on said heating unit but also receiving secondary heat from a part of the apparatus whose temperature is subject to undesirable variations, a thermostatic element on said device, means for substantially nullifying the effect of said secondary heat upon said thermostatic element, a switch included in circuit with said heating unit to control the same, said switch comprising a contact bridge and two sets of normally-closed contacts controlled by said bridge, means operable by said thermostatic element for actuating said bridge so as to open first one set of contacts and then the other set of contacts, electrical connections controlled by said switch so as to operate said heating unit at one wattage level when both sets of contacts are closed, and to operate said heating unit at a lower wattage level when one set of contacts opens, and to deenergize said heating unit when the other set of contacts opens, and manually operable means for adjusting said switch for warming, simmering and boiling operations, the operation of the heating unit by said switch for the different adjustments being as follows: intermittent on-off operation of the unit at its low wattage level for warming of the vessel contents after the selected temperature has been attained, continuous operation of the unit at its low wattage level during simmering and slow boiling of the vessel contents, and operation of the unit at its high wattage level during rapid boiling of the vessel contents.

4. In an electrically operated cooking apparatus, an electrical heating unit comprising a pair of main heating elements and a relatively low wattage heating element, a supply line including two outer conductors and a neutral conductor, thermal-responsive means arranged to receive heat by thermal conduction from a cooking vessel placed on said heating unit and also receiving heat directly from the heating unit, means for substantially nullifying the effect of said direct heat on said thermal-responsive means, switching means adapted in one position to connect said main heating elements in series across said outer conductors and to connect said low wattage element between said neutral conductor and the junction of the main elements, said switching means being adapted in another position to connect one of said main elements and said low wattage element in series between an outer conductor and said neutral conductor, and means operable by said thermal-responsive means for actuating said switching means.

5. In an electrically operated cooking apparatus, an electrical heating unit comprising a main heating element and a relatively low wattage heating element connected in series, thermal-responsive means arranged to receive heat by thermal conduction from a cooking vessel placed on said heating unit and also receiving heat directly from the heating unit, means for substantially nullifying the effect of said direct heat on said thermal-responsive means, switching means adapted in one position to short-circuit said low wattage element and upon movement to another position to remove the short-circuit and upon further movement in the same direction to deenergize said unit, means operable by said thermal-responsive means for actuating said switching means, and manually-operable means for adjusting said switching means for warming, and slow and rapid boiling operations, the operation of the heating unit by said switching means for the different adjustments being as follows: intermittent on-off operation of the unit at its low wattage level for warming of the vessel contents, continuous operation of the unit at its low wattage level for a slow boiling of the vessel contents, and operation of the unit at its high wattage level during rapid boiling of the vessel contents.

6. In an electrically operated cooking apparatus, a multi-section electrical heating unit adapted to operate at different wattage levels, an electrical circuit for energizing said unit, an adjustable thermostatic control device constructed and arranged to receive primary heat by thermal conduction from a cooking vessel placed on said heating unit but also receiving secondary heat from a part of the apparatus whose temperature is subject to undesirable variations, a thermostatic element on said device, means for substantially nullifying the effect of said secondary heat upon said thermostatic element, means for supplying additional heat to said thermostatic element in proportion to the energization of said heating unit, a switch operable by said thermostatic element and included in circuit with said heating unit to control the same, said switch being adapted in one position to operate said heating unit at one wattage level and in another position to operate said unit at a relatively low wattage, and manually operable means for adjusting said switch for operation over a substantial temperature range including warming, simmering and boiling operations, whereby said control device is adapted, by the effective heat influences thereon and by its adjustment, to effect and efficiently control varying degrees of ebullition of the contents of said vessel.

7. In an electrically operated cooking apparatus, an electrical heating unit, an electrical circuit for energizing said unit, an adjustable thermostatic control device constructed and arranged to receive primary heat by thermal conduction from a cooking vessel placed on said heating unit but also receiving secondary heat from a part of the apparatus whose temperature is subject to undesirable variations, a thermostatic element on said device, a switch operable by said thermostatic element and included in circuit with said heating unit to control the same, means for substantially nullifying the effect of said secondary heat upon said thermostatic element, means for supplying additional heat to said thermostatic element in proportion to the energization of said heating unit, and manually operable means for adjusting said control device for operation over a substantial temperature range including simmering and boiling operation, whereby said control device is adapted, by the effective heat influences thereon and by its adjustment, to effect and efficiently control varying degrees of ebullition of the contents of said vessel.

8. In an electrically operated cooking apparatus, an electrical heating unit, an electrical circuit for energizing said unit, an adjustable thermostatic control device constructed and arranged to receive primary heat by thermal conduction from a cooking vessel placed on said heating unit but also receiving secondary heat from a part of the apparatus whose temperature is subject to undesirable variations, a thermostatic element on said device, a switch operable by said thermostatic element and included in circuit with said heating unit to control the same, means for substantially nullifying the effect of said secondary heat upon said thermostatic element, a heater element adjacent said thermostatic element and included in circuit with said heating unit for supplying additional heat to said thermostatic element in proportion to the energization of said heating unit, and manually operable means for adjusting said control device for operation over a substantial temperature range including simmering and boiling operation, whereby said control device is adapted, by the effective heat influences thereon and by its adjustment, to effect and efficiently control varying degrees of ebullition of the contents of said vessel.

9. In an electrically operated cooking apparatus, an electrical heating unit, an electrical circuit for energizing said unit, an adjustable thermostatic control device constructed and arranged to receive primary heat by thermal conduction from a cooking vessel placed on said heating unit but also receiving secondary heat from a part of the apparatus whose temperature is subject to undesirable variations, a thermostatic element on said device, a switch operable by said thermostatic element and included in circuit with said heating unit to control the same, a compensating thermal responsive element arranged cooperatively with said thermostatic element to substantially nullify the effect of said secondary heat upon said thermostatic element, means for supplying additional heat to said thermostatic element in proportion to the energization of said heating unit, and manually operable means for adjusting said control device for operation over a substantial temperature range including simmering and boiling operation, whereby said control device is adapted, by the effective heat influences thereon and by its adjustment, to effect and efficiently control varying degrees of ebullition of the contents of said vessel.

10. In an electrically operated cooking apparatus, an electrical heating unit adapted to operate at different wattage levels, thermal-responsive means arranged to receive primary heat by thermal conduction from a cooking vessel placed on said heating unit but also receiving secondary heat from a part of the apparatus whose temperature is subject to undesirable variations, switching means operable by said thermal-responsive means to control the energization of said heating unit and to establish different wattage levels thereof, and auxiliary thermal-responsive means operable upon said switching means in a sense opposite to that of said first-mentioned thermal-responsive means, and arranged to substantially nullify the effect of said secondary heat when a cooking vessel is on the heating unit, and to be quickly influenced by cooling air upon removal of the cooking vessel, whereby said switching means is rapidly operated to initiate or terminate the operation of said heating unit in response to placement of a cooking vessel on, or removal thereof from, the heating unit.

11. In an electrically operated cooking apparatus, an annular electrical heating unit adapted to operate at different wattage levels, a thermostatic control device disposed within the annulus, there being an annular space between said device and said heating unit, thermal-responsive means on said device arranged to receive primary heat by thermal conduction from a cooking vessel placed on said heating unit but also receiving secondary heat from the annual heating unit, switching means on said device operable by said thermal-responsive means to control the energization of said heating unit and to establish different wattage levels thereof, and a thermostatic element on said device operable upon said switching means in a sense opposite to that of said thermal-responsive means, and arranged to substantially nullify the effect of said secondary heat when a cooking vessel is on the heating unit, and to be quickly influenced by cooling air flowing upward through said space upon removal of the cooking vessel, prior to the effect of said air on said thermal-responsive means, whereby said switching means is rapidly operated to initiate or terminate the operation of said heating unit in response to placement of a cooking vessel on, or removal thereof from, the heating unit.

JOSEPH W. MYERS.